United States Patent
Ryan et al.

(10) Patent No.: US 10,225,846 B2
(45) Date of Patent: Mar. 5, 2019

(54) DETERMINISTIC SERVICE CHAINING BETWEEN NFV-POP'S

(71) Applicant: Intel Corporation, Santa Clara, CA (US)

(72) Inventors: Brendan N. Ryan, Limerick (IE); Rory Browne, Shannon (IE)

(73) Assignee: Intel Corporation, Santa Clara, CA (US)

( * ) Notice: Subject to any disclaimer, the term of this patent is extended or adjusted under 35 U.S.C. 154(b) by 257 days.

(21) Appl. No.: 14/969,490

(22) Filed: Dec. 15, 2015

(65) Prior Publication Data

US 2017/0171871 A1 Jun. 15, 2017

(51) Int. Cl.
*H04W 72/08* (2009.01)

(52) U.S. Cl.
CPC .................................. *H04W 72/087* (2013.01)

(58) Field of Classification Search
CPC .................................................... H04W 72/087
See application file for complete search history.

(56) References Cited

U.S. PATENT DOCUMENTS

| 9,929,949 | B2 * | 3/2018 | Mahadevan | H04L 45/70 |
| 2003/0133443 | A1 * | 7/2003 | Klinker | H04L 29/06 370/353 |
| 2006/0245357 | A1 * | 11/2006 | Ilan | H04L 12/5602 370/235 |
| 2013/0185461 | A1 * | 7/2013 | Narita | G06F 11/3051 710/15 |
| 2015/0085115 | A1 * | 3/2015 | Sternberg | H04N 7/18 348/143 |
| 2015/0131964 | A1 * | 5/2015 | Liu | G08B 13/19665 386/226 |
| 2015/0143456 | A1 * | 5/2015 | Raleigh | H04W 12/08 726/1 |
| 2015/0356182 | A1 * | 12/2015 | Ivershen | H04L 67/1095 707/723 |
| 2016/0065420 | A1 * | 3/2016 | Burton | G06F 11/3051 709/224 |

(Continued)

OTHER PUBLICATIONS

"Using SDN-aware Service Assurance to Bring Open and Deterministic Service Management to NFV", Solution brief Intel® Service Assurance Administrator (Intel® SAA) Intel® Xeon® Processors, (2015), 8 pgs.

*Primary Examiner* — Phuc H Tran
(74) *Attorney, Agent, or Firm* — Schwegman Lundberg & Woessner, P.A.

(57) ABSTRACT

Described herein are devices and techniques for deterministic service chaining between virtual network functions (VNFs). A control device can comprise a wide area network (WAN) interface, at least one local interface, and processing circuitry. The WAN interface can communicate with a plurality of WAN links. The at least one local interface can communicate with VNFs. The processing circuitry configured to: receive performance indicators, identify one of the plurality of devices having a value for a performance indicator that exceeds a threshold for a corresponding key performance indicator, and provide notification of a violation based on the identifying. The performance indicators can include latency and resource usage from the WAN interface and the at least one local interface. Also described are other embodiments.

24 Claims, 4 Drawing Sheets

(56) References Cited

U.S. PATENT DOCUMENTS

| | | | |
|---|---|---|---|
| 2016/0104093 A1* | 4/2016 | Fletcher | G06Q 10/06393 |
| | | | 705/7.39 |
| 2016/0300142 A1* | 10/2016 | Feller | G06Q 10/06395 |
| 2016/0381580 A1* | 12/2016 | Kwan | H04W 24/08 |
| | | | 370/252 |
| 2017/0094377 A1* | 3/2017 | Herdrich | H04L 41/5009 |
| 2017/0103014 A1* | 4/2017 | Segler | G06F 11/3688 |

\* cited by examiner

DETERMINISTIC SERVICE CHAINING BETWEEN NFV-POP'S

TECHNICAL FIELD

Embodiments described generally herein relate to processing of data packets sent or received through a network. Some embodiments relate to deterministic service chaining between virtual network functions.

BACKGROUND

Telecommunications networks can have custom hardware and software designs. The custom hardware and software designs can be managed by tightly integrated network management systems (NMS). The hardware, network performance, and service integrity can be tracked with very high degrees of accuracy. Because each appliance can be a custom design, a tight coupling between the platform and NMS can be necessary.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

In software defined networks (SDN) and network functions virtualization (NFV) systems can run as virtual network functions (VNFs) on commercial off-the-shelf (COTS) hardware managed by an open pluggable management and orchestration system (MANO). As all the VNFs run on COTS, there is no need to couple hardware and NMS according to specific vendors or hardware. There is a risk that performance and service awareness could be impacted or developed in a proprietary way.

An open method of monitoring and reporting x86 platforms and network conditions between operator points of presence (PoPs) for any third party MANO application can utilize key performance indicators (KPIs) in real-time. One non-limiting example of utilizing KPIs as disclosed herein include resource management in local area network (e.g., a Gi-LAN) architectures as described herein.

Another example of using SDN/NFV for use with mobile network operators (MNOs) is service chaining in the Gi-LAN. The Gi-LAN can be a part of the network that connects the mobile network to data networks, such as the Internet and operator cloud services. Service chaining can allow different types of traffic to traverse only appropriate functions and also reduces operational expense (OpEx) on upgrades or the introduction of new service functions. MNOs are one area of use, however, there is a wider context to Gi-LAN service chaining uses. For example, in a large, densely populated urban area, there could be multiple Gi-LAN sites.

Operators can have schemes for failover of services from one Gi-LAN site to another. However, the failover schemes can be coarse with no intelligence in terms of the suitability of the WAN link between sites and the state of the VNF instance in the other site. Thus, sites are usually over-dimensioned to cope with failures at adjacent sites. The lack of awareness of other sites presents a large capital expense (CapEx) problem for service providers in that the only way to provide determinism for subscriber quality of experience (QOE) under failure conditions is to massively overbuild sites.

In addition, Gi-LAN sites may not be good at dealing with unexpected local overload. Extraordinary events in a particular area can have the potential to unexpectedly overload a local Gi-LAN. This can be prevented with system and methods disclosed herein that dynamically load share network services to other sites during an overload.

The systems and methods disclosed herein include a virtual service assurance manager (vSAM) in a NFV platform or NFV infrastructure (NFVI). The vSAM can monitor the performance of WAN links between NFVI-PoP sites and the state of VNFs on the sites. A vSAM can run on each NFVI-PoP site. The vSAM can gather KPIs for NFVI-PoP interconnect links and platform resource usage by the local VNFs.

The vSAM can generate a notification to a local NFV orchestrator, service chain controller or other management entities. The notification can be generated in instances of a KPI violation. The KPI violation can trigger an adjustment of a service chain path. For example, after receiving performance indicators that can include latency and resource usage from a WAN interface, a device having a value for a performance indicator that violates a service level agreement for a corresponding key performance indicator can be identified. Once the violation has been identified, notification of the violation can be provided.

The violation can be detected upon receiving the performance indicators. In addition, upon detecting the violation, the notification can be generated and transmitted to a central repository as disclosed herein. Furthermore, service chains can be updated based on detecting the violation as disclosed herein. The KPIs used to detect the violation can be selected from a plurality of KPIs. For example, an application may select various KPIs from a plurality of KPIs based on functions and services that may be needed by the application.

A central repository can be used by all of the sites to share the state of VNFs for each site. This sharing of site information can allow the NFV orchestrator on each site to have visibility of the state of VNFs across the network. In case of a failure in a local NFVI-PoP such as, but not limited to, VNF overload or VNF failure, the NFV orchestrator or a service chaining application can make intelligent decisions on use of VNF instances on other NFVI-PoP sites for service chaining paths.

An example of using SDN/NFV service chaining can include the chaining of VNFs in a Gi-LAN site. MNOs can use schemes to failover services between sites. For instance, if a carrier grade network address translation (CG-NAT) fails, a multi-protocol label switching (MPLS) provider edge (PE) on the Gi-LAN site can re-route some or all of the traffic from one mobile service core site to another. When a PE re-routes traffic without knowledge of how remote CG-NATs may be loaded, traffic could be routed to an overloaded site and service levels could be degraded.

Furthermore, suitability of the link between Gi-LAN sites for diversion of traffic flows can be considered. For example, a service chain handling voice traffic should be diverted to a site with a low latency link because voice traffic is delay sensitive.

Figure 1:
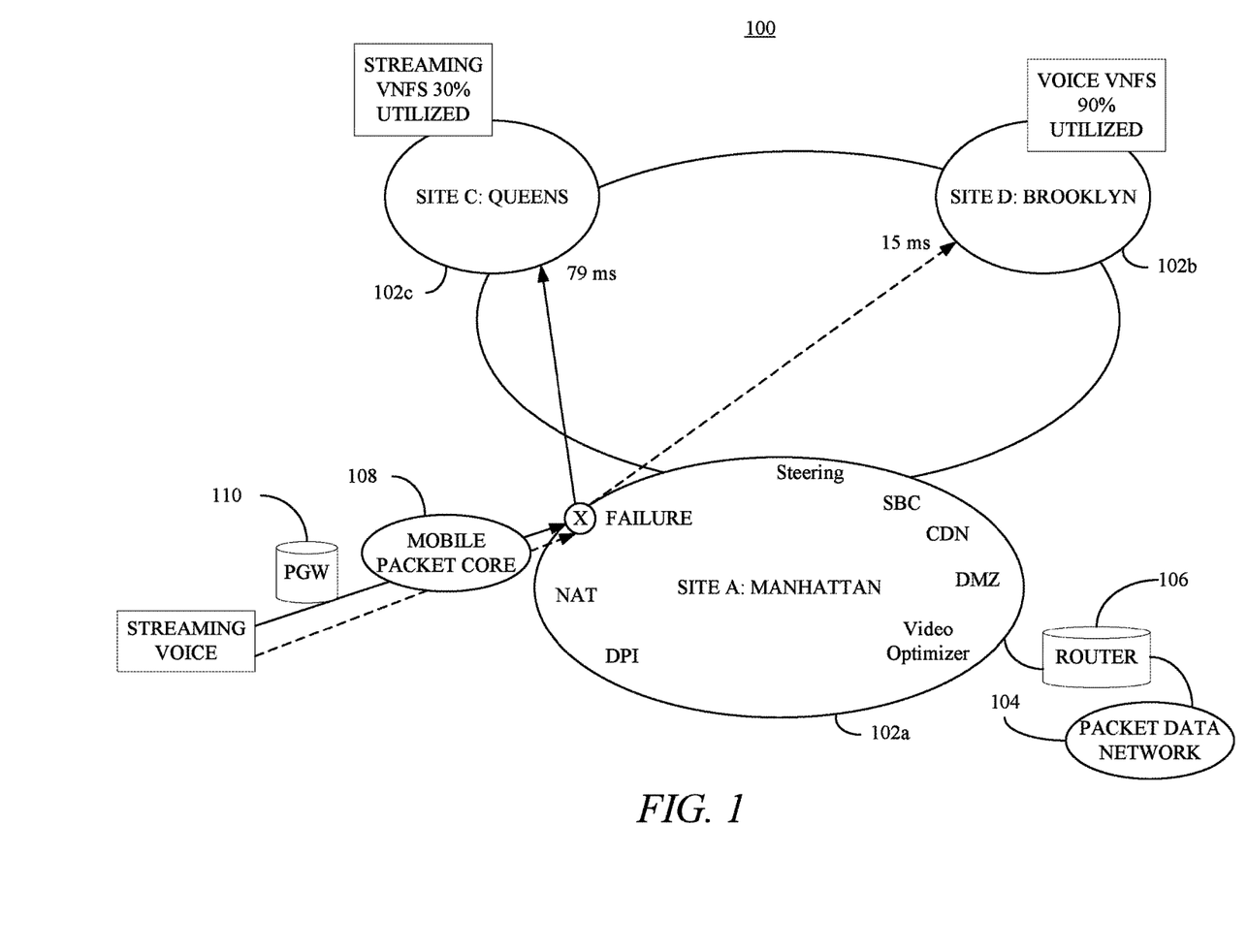
FIG. 1 illustrates a traffic steering use case in accordance with some embodiments.

FIG. 1 illustrates a schematic of an operating environment 100 for traffic steering. The operating environment 100 includes three Gi-LAN sites 102a, 102b, and 102c. The three Gi-LAN sites 102a, 102b, and 102c can be for differing geographic location such as, Manhattan, Brooklyn, and Queens, New York City. The Gi-LAN site 102a is shown in detail, however, the Gi-LAN sites 102b and 102c can include the same or similar components. Also as shown in FIG. 1, the operating environment 100 can include one or more packet data networks 104, routers 106, mobile packet cores 108, packet data network gateways (PGW) 110.

As shown in FIG. 1, Gi-LAN site 102a can include a SDN infrastructure that can deploy two or more service chains on the Gi-LAN 102a, for example located in Manhattan. In this example, a first service chain can direct streaming traffic towards a local content delivery network (CDN) and video optimizer (VO). A second service chain can send voice traffic to the local session border controller (SBC) for a Voice Over Long-Term Evolution (VoLTE) client. While FIG. 1 uses video streaming and VoLTE as example services, many different types of service-chains may be deployed without departing from the scope of this disclosure.

One possible failure scenario includes the local VO and CDN in Manhattan (i.e., Gi-LAN 102a) becoming unavailable. The Gi-LAN 102c can be lightly utilized (e.g., 30% utilization), but have a high latency (e.g., 79 ms). The Gi-LAN 102c can be heavily utilized (e.g., 90% utilization), but have a low latency (e.g., 15 ms).

A streaming application may not be delay sensitive. Thus, the service function chaining (SFC) controller, working in conjunction with the vSAM at Gi-LAN 102a, can redirect the service chain to Queens (i.e., Gi-LAN 102c), which is lightly loaded, but has a slow virtual link. Thus, the streaming service is not severely impacted by the local failures. This scenario could apply equally to situations where the local VO or CDN are heavily loaded and unable to service new flows.

A second possible failure scenario includes the local SBC at Gi-LAN 102a handling the voice traffic and becoming overloaded or unavailable due to a software or hardware malfunction. In this second failure scenario, the SFC controller can decide to chain the traffic to Brooklyn (i.e., Gi-LAN 102b) for SBC functionality. The SFC controller can choose to route traffic to Brooklyn even though the Gi-LAN 102b in Brooklyn is heavily loaded (e.g., 90% utilization). The SFC controller may choose to route traffic to Brooklyn instead of Queens because the voice application could be delay sensitive and thus, making the faster virtual link (15 ms versus 79 ms latency) preferable.

These two example failure scenarios demonstrate criteria that can be used to implement deterministic load sharing and granular failover of virtualized Gi-LAN resources across the WAN in real time. The systems and methods detailed herein can offer sophisticated service chaining to address service provider OpEx concerns. In addition, the systems and methods detailed herein can offer intelligent resource sharing between NFVI-PoPs to help reduce CapEx.

Figure 2:
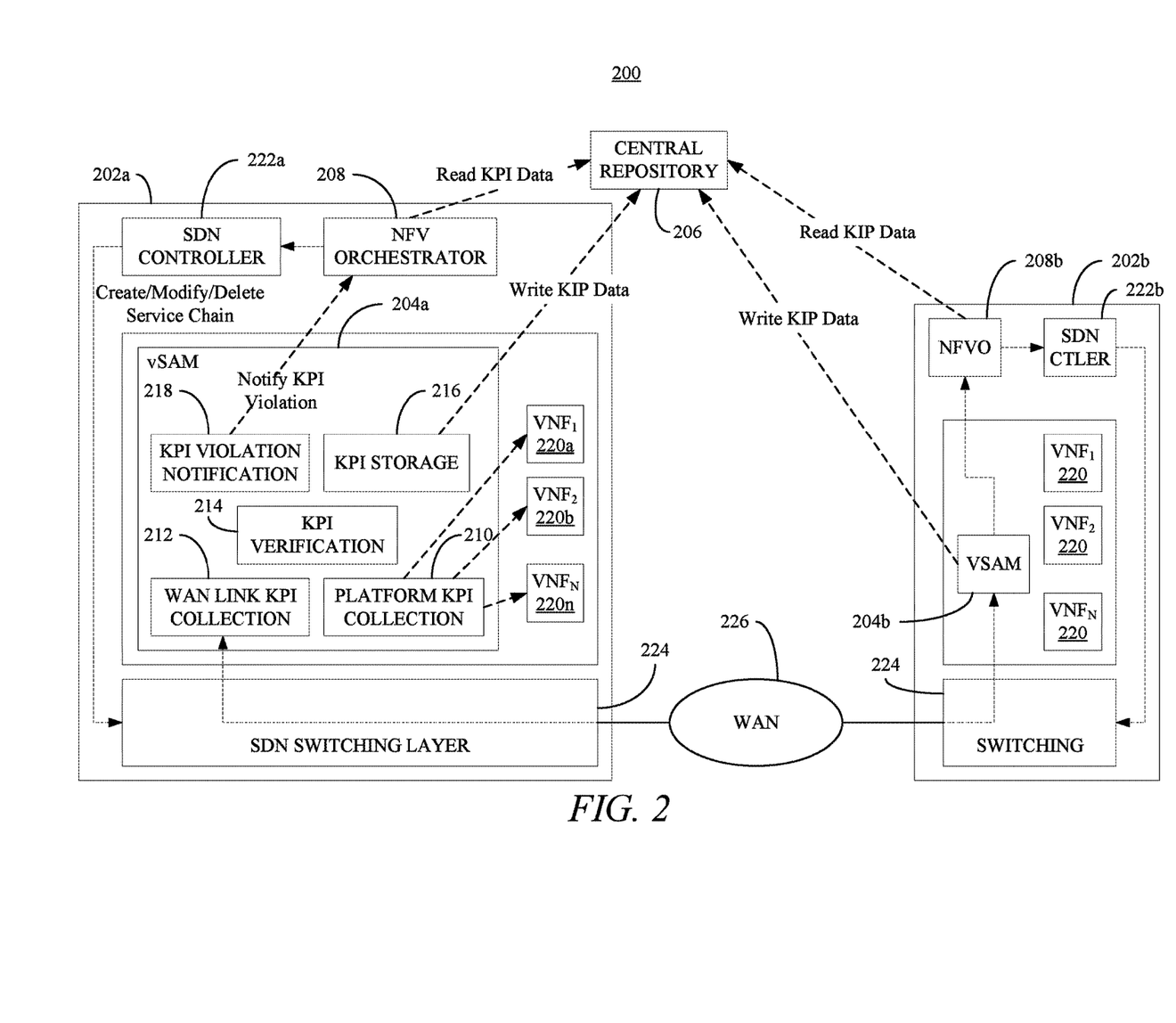
FIG. 2 illustrates a virtual service assurance manager architecture in accordance with some embodiments.

FIG. 2 illustrates a vSAM architecture in accordance with various embodiments disclosed herein. For clarity, FIG. 2 only shows two data centers 202a and 202b, but any number of data centers can be implemented using the systems and methods disclosed herein. In addition, for clarity only the data center 202a is shown in detail. The data center 202b, or any other data center, could have the same or similar components as the data center 202a.

As shown in FIG. 2, utilization of resources across multiple NFVI-PoP sites for service chaining can be deployed using a vSAM 204a and vSAM 204b (collectively vSAM 204) at each data centers 202a and 202b. The vSAMs 204 in each site can perform real-time monitoring of the health of the VMs and hosts in the local NFVI-PoP as well as the performance of WAN links to other sites.

The vSAM 204 can collect platform KPIs. The KPIs can be related to platform resource usage by the local VNFs. For example, the platform resource usage can include CPU usage, memory usage, inter-VM resource contention, etc. In addition, the vSAM 204 can collect KPIs that relate to the performance capability of WAN links to other sites. For example, the KPIs can include latency, delay variation, bandwidth-usage, packet-loss, etc.

The vSAM 204 can store KPI data to a central repository 206. The central repository 206 may be accessed by vSAMs operating at each site. In addition, the vSAM 204 can compare KPI values to pre-configured error thresholds. Upon comparing the KPI values to the pre-configured error thresholds, the vSAM 204 can notify a local NFV orchestrator, SFC controllers or any other management entity of a threshold violation. A threshold violation can occur when a KPI value is lower or greater than a pre-configured error threshold.

In the event a KPI violation notification is received from a vSAM 204, the SFC controller can read data in the vSAM KPI repository and use the data to make intelligent decisions on how to adapt service chains to make use of external VNF instances.

As shown in FIG. 2, a vSAM can include a platform KPI collection module 210, a WAN link KPI collection module 212, a KPI verification logic module 214, a KPI storage module 216, and a KPI violation notification module 218. The platform KPI collection module 210 can collect platform resource usage KPIs for local VNFs, such as VNF 220a, 220b, . . . 220n. The WAN Link KPI collection module 212 can collect WAN Link KPIs for NFVI-PoP interconnects. The KPI verification logic module 214 can compare the latest KPIs to KPI violation threshold values. The KPI violation threshold values may be pre-configured in vSAM 204 or may be provisioned by the NFV orchestrator 208.

The KPI storage module 216 can store KPIs in the central repository 206. In addition, the KPI storage module 216 can act as the central repository 206. The KPI violation notification module 218 can notify the NFV orchestrator 208 of any detected KPI violations.

A data center 202 can also include a SDN controller 222. The SDN controller 220 can include a collection of modules that can perform different network tasks. For example, the SDN controller 220 can inventorying what devices are within the network and the capabilities of each device, gathering network statistics, etc. All of the various data centers 202 can utilize a switching layer 224 and a WAN 226 to communicate.

Figure 3:
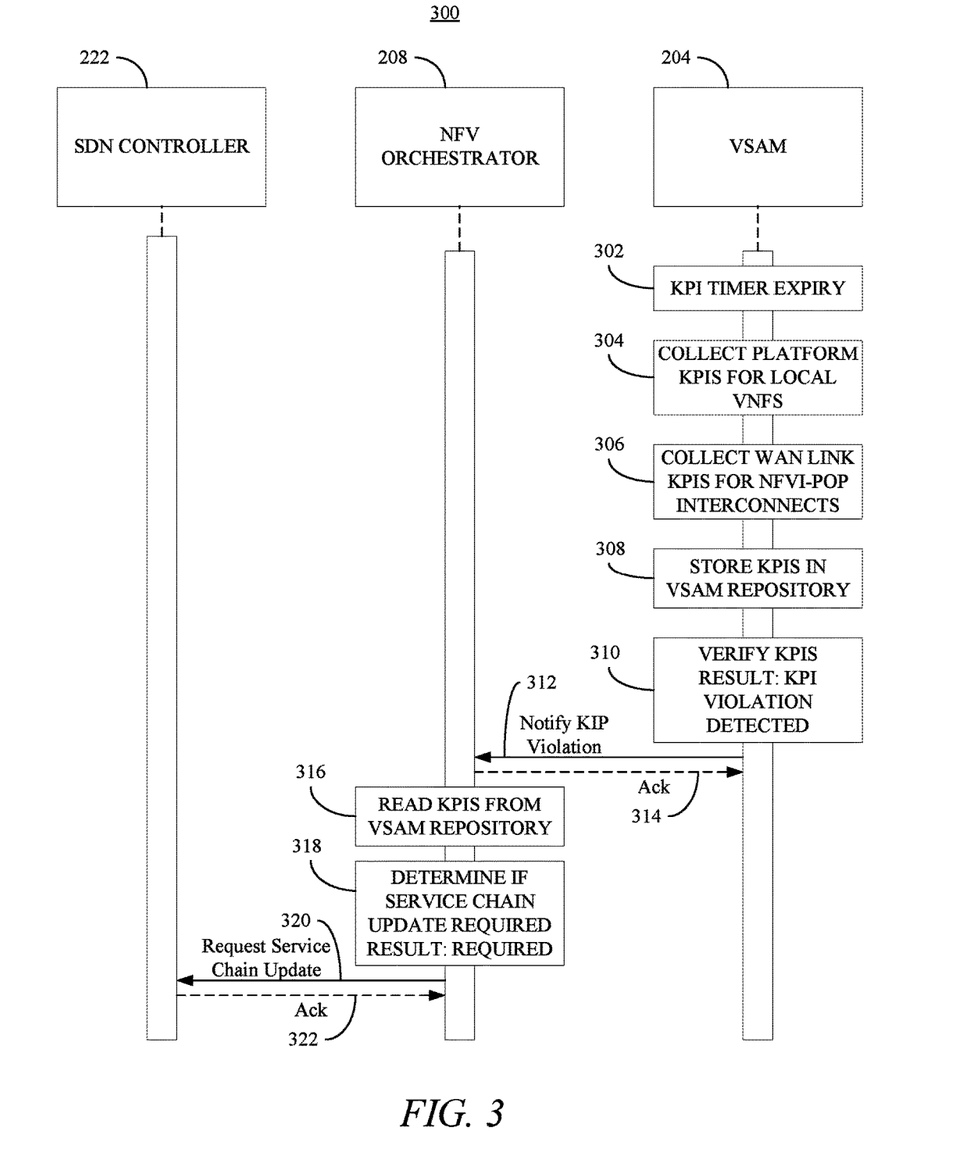
FIG. 3 illustrates a flow diagram for service assurance and a key performance indicator violation detection via a virtual service assurance manager in accordance with some embodiments.

FIG. 3 illustrates a flow diagram for an example method 300 for monitoring service assurance KPIs and notifying a local NFV orchestrator in event of a KPI violation. In the method 300, the vSAM 204 can execute a KPI collection timer 302. Upon the collection timer expiring, the vSAM 204 can collect local platform KPIs 304. In addition, the vSAM 204 can collect WAN link KPIs 306. The various KPI data can be requested by the vSAM 204 at regular intervals. In addition, the various network components may be provisioned by the vSAM 204 to send KPI data immediately without the vSAM 204 requesting the data, in case of a KPI violation being detected by the network component itself.

Once the vSAM 204 has collected local platform KPIs and WAN link KPIs, the vSAM 204 can store the KPI data in the centralized repository 206. After the various KPI data has been collected and stored, the vSAM 204 can detect a KPI threshold violation 310. The KPI threshold violation can be detected by comparing instantaneous KPI values to configured threshold values.

When a KPI violation has been detected, the vSAM 204 can send a KPI violation notification 312 to the NFV orchestrator 208 or other management entities. Upon receiving the KPI violation notification the NFV orchestrator 208 can send, and the vSAM 204 can receive, an acknowledgement of the KPI violation 314.

The NFV orchestrator 208 can read all the KPI data 316 from the central repository 206. Upon reading the KPI data, the SFC controller can determine if a service chain update is needed 318 (e.g., due to a service level agreement violation). For example, the NFV orchestrator 208 can utilize an external VNF instance for the necessary service chaining update 320 to be performed by the SDN controller 222. The NFV orchestrator 208 can request the service chaining update 320 from the SDN controller 222. The SDN controller 222 can send an acknowledgement 322 to the NFV orchestrator 208 of the service chain update.

Gi-LAN service chaining can be used for service assurance as it can enable mobile service providers to make more efficient use of their network function resources across multiple Gi-LAN sites. Such intelligent service chaining can enable service providers to avoid overbuilding sites in order to handle traffic diverted from other sites deterministically in failure scenarios. In addition, the systems and methods disclosed herein can be utilized for applications that may need to share resources intra-PoP or inter-PoP. As such virtual evolved packet cores (vEPC), virtual customer premise equipment (vCPE), virtual Internet protocol (IP) multimedia subsystems (vIMS), and other applications could also benefit from an open service assurance fabric for NFV as provided by the vSAM 204 as discussed herein.

Figure 4:
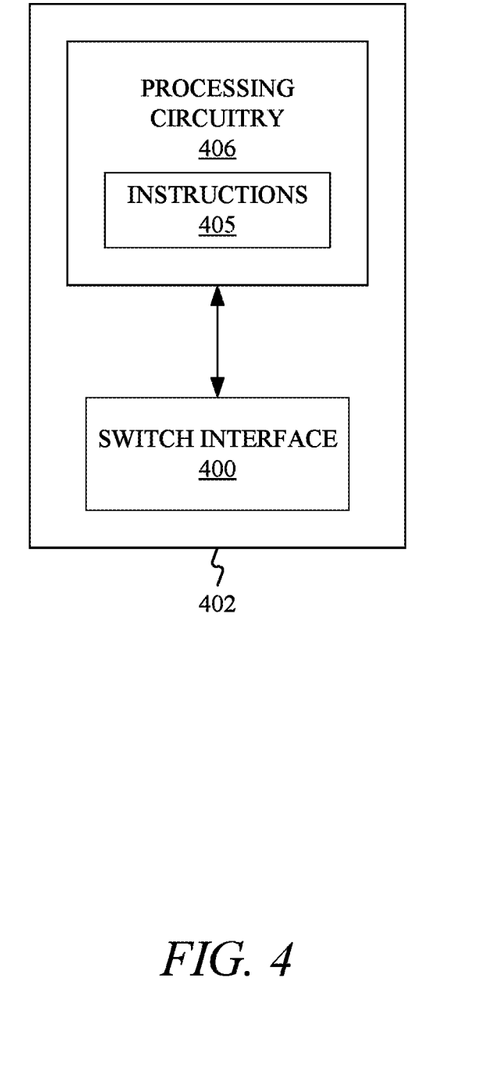
FIG. 4 illustrates a block diagram of a hardware switch in accordance with some embodiments.

FIG. 4 illustrates a control device 402 in accordance with some embodiments. The control device 402 can be a hardware device used within the Gi-LAN 102 or the data center 202. The control device 402 includes a switch interface 400 to communicate with one or more hardware switches, nodes, data centers, or network devices. The switch interface 400 can include ingress and egress interfaces for communicating with other switches, nodes, or other network devices. For example, the switch interface 400 can include a local interface and a WAN interface that can allow the control device 402 to communicate with a plurality of WAN links.

The control device 402 includes processing circuitry 406 to perform functionalities and operations as described herein. It will be understood that any or all of the functions and operations performed by processing circuitry 406 can be executed with hardware, software, firmware, or any combination thereof, on one or more processing cores, such as a core of the control device 402.

In embodiments, the processing circuitry 406 can receive performance indicators that can include latency and resource usage from a WAN interface and at least one local interface. The processing circuitry 406 can identify one of a plurality of devices having a value for a performance indicator that violates a service level agreement for a corresponding key performance indicator. The processing circuitry can also provide notification of a violation based on identifying the one of the plurality of devices that violates the service level agreement.

In embodiments, the processing circuitry 406 can detect a key performance indicator violation responsive to receiving the performance indicators. Upon detecting the key performance indicator violation, the processing circuitry 406 can generate a notification and transmit the notification to a central repository within a network. In addition, processing circuitry 406 can update a service chain in response to detecting the key performance indicator violation.

In embodiments, the processing circuitry 406 can store the performance indicators for each of the plurality of devices within a network in a central repository. For example, the processing circuitry 406 of the control device 402 can include a memory for storing the central repository.

Examples, as described herein, may include, or may operate on, logic or a number of components, modules, or mechanisms. Modules are tangible entities (e.g., hardware) capable of performing specified operations and may be configured or arranged in a certain manner. In an example, circuits may be arranged (e.g., internally or with respect to external entities such as other circuits) in a specified manner as a module. In an example, at least a part of one or more computer systems (e.g., a standalone, client or server computer system) or one or more processors of the control device 402 may be configured by firmware or software (e.g., instructions 405, an application portion, or an application) as a module that operates to perform specified operations. In an example, the software may reside on at least one machine-readable medium. In an example, the software, when executed by the underlying hardware of the module (e.g., the control device 402), can include instructions 405 to cause the hardware to perform the specified operations.

For example, instructions 405 can cause hardware to detect characteristics of a plurality of packet streams received at a switch interface or at Ethernet ports of fixed logic hardware switches. The characteristics can include whether a respective packet stream of the plurality of packet streams is a simple packet stream, based on a number of CPU machine cycles are expected to be used by the respective packet stream. The instructions 405 can cause the hardware to distribute the plurality of packet streams between a hardware switch and software data plane components based on detected characteristics of the plurality of packet streams, such that simple packet streams of the plurality of packet streams are distributed to the hardware switch.

In various embodiments, the instructions 405 can optionally cause the hardware to detect traffic load characteristics corresponding to the plurality of packet streams and to direct one or more packet streams to the one or more hardware switches based on traffic load characteristics. The instructions 405 can cause the hardware to detect that a packet processing workload has fallen below a threshold value based on the detected traffic load characteristics, and to instructing at least one processing core to enter a sleep mode responsive to the detecting.

The term "module" is understood to encompass a tangible entity, be that an entity that is physically constructed, specifically configured (e.g., hardwired), or temporarily (e.g., transitorily) configured (e.g., programmed) to operate in a specified manner or to perform at least part of any operation described herein. Considering examples in which modules are temporarily configured, a module need not be instantiated at any one moment in time. For example, where the modules comprise a general-purpose hardware processor configured using software; the general-purpose hardware processor may be configured as respective different modules at different times. Software may accordingly configure a hardware processor, for example, to constitute a particular module at one instance of time and to constitute a different module at a different instance of time. The term "application," or variants thereof, is used expansively herein to include routines, program modules, programs, components, and the like, and may be implemented on various system configurations, including single-processor or multiprocessor systems, microprocessor-based electronics, single-core or multi-core systems, combinations thereof, and the like. Thus, the term application may be used to refer to an embodiment of software or to hardware arranged to perform at least part of any operation described herein.

The term "machine-readable medium" may include any medium that is capable of storing, encoding, or carrying instructions 405 for execution by a machine (e.g., the control device 402 or any other module) and that cause the machine to perform any one or more of the techniques of the present disclosure, or that is capable of storing, encoding or carrying data structures used by or associated with such instructions. In other words, the processing circuitry 406 can include instructions and can therefore be termed a machine-readable medium in the context of various embodiments. Other non-limiting machine-readable medium examples may include solid-state memories, and optical and magnetic media. Specific examples of machine-readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; and CD-ROM and DVD-ROM disks.

The instructions 405 may further be transmitted or received over a communications network using a transmission medium utilizing any one of a number of transfer protocols (e.g., frame relay, internet protocol (IP), TCP, user datagram protocol (UDP), hypertext transfer protocol (HTTP), etc.). Example communication networks may include a local area network (LAN), a wide area network (WAN), a packet data network (e.g., the Internet), mobile telephone networks ((e.g., channel access methods including Code Division Multiple Access (CDMA), Time-division multiple access (TDMA), Frequency-division multiple access (FDMA), and Orthogonal Frequency Division Multiple Access (OFDMA) and cellular networks such as Global System for Mobile Communications (GSM), Universal Mobile Telecommunications System (UMTS), CDMA 2000 1×* standards and Long Term Evolution (LTE)), Plain Old Telephone (POTS) networks, and wireless data networks (e.g., Institute of Electrical and Electronics Engineers (IEEE) 802 family of standards including IEEE 802.11 standards (WiFi), IEEE 802.16 standards (WiMax®) and others), peer-to-peer (P2P) networks, or other protocols now known or later developed.

The term "transmission medium" shall be taken to include any intangible medium that is capable of storing, encoding or carrying instructions for execution by hardware processing circuitry, and includes digital or analog communications signals or other intangible medium to facilitate communication of such software.

Additional Notes & Examples

In Example 1, a control device can comprise a wide area network (WAN) interface, at least one local interface, and processing circuitry. The WAN interface can communicate with a plurality of WAN links. The at least one local interface can communicate with VNFs. The processing circuitry configured to: receive performance indicators, identify one of the plurality of devices having a value for a performance indicator that violates a service level agreement for a corresponding key performance indicator, and provide a notification of a violation based on identifying the one of the plurality of devices that violates the service level agreement. The performance indicators can include latency and resource usage from the WAN interface and the at least one local interface. Also described are other embodiments.

In Example 2, Example 1 can optionally include the processing circuitry being further configured to detect a key performance indicator violation responsive to receiving the performance indicators.

In Example 3, any of Examples 1 or 2 can optionally include the processing circuitry being further configured to: generate the notification upon detecting a key performance indicator violation; and transmit the notification to a central repository within the network.

In Example 4, any of Examples 1-3 can optionally include the processing circuitry being further configured to update a service chain in response to detecting a key performance indicator violation.

In Example 5, any of Examples 1-6 can optionally include the key performance indicator being selected from a plurality of key performance indicators. Each of the plurality of key performance indicators can correspond to an application.

In Example 6, Example 5 can optionally include the application being a video streaming service or a voice over internet protocol telephone service.

In Example 7, any of Examples 1-6 can optionally include the control device being a virtual network function orchestrator.

In Example 8, any of Examples 1-7 can optionally include the processing circuitry being further configured to store the performance indicators for each of the plurality of devices within the network in a central repository.

In Example 9, any of Examples 1-8 can optionally include the control device further including a memory for storing a central repository.

In Example 10, a machine-readable medium can include instructions that, when executed on a machine, cause the machine to perform operations. The operations can including: receiving, at a wide area network (WAN) interface, performance indicators; identify one of a plurality of devices having a value for a performance indicator that violates a service level agreement for a corresponding key performance indicator; and provide a notification of violation based on identifying the one of the plurality of devices that violates the service level agreement. The performance indicators can include latency and resource usage from the WAN interface and the at least one local interface.

In Example 11, Example 10 can optionally include the operations further including detecting a key performance indicator violation responsive to receiving the performance indicators.

In Example 12, any of Examples 10 or 11 can optionally include the operations further including: generating the notification upon detecting the key performance indicator violation, and transmitting the notification to a central repository within a network.

In Example 13, any of Examples 10-12 can optionally include the operations further including updating a service chain in response to detecting the key performance indicator violation.

In Example 14, any of Examples 10-13 can optionally include the machine-readable medium being stored in non-transitory memory of a control device. The control device can act as a virtual network function orchestrator.

In Example 15, any of Examples 10-14 can optionally include the operations further including storing the performance indicators for each of the plurality of devices within the network in a central repository.

In Example 16, a control device comprise: means for receiving performance indicators from a WAN interface and at least one local interface; means for identifying one of a plurality of devices having a value for a performance indicator that violates a service level agreement for a corresponding key performance indicator; and means for providing a notification of violation based on identifying the one of the plurality of devices that violates the service level agreement. The performance indicators can include including latency and resource usage information.

In Example 17, Example 16 can optionally include means for detecting a key performance indicator violation responsive to receiving the performance indicators.

In Example 18, any of Examples 16 or 17 can optionally include: means for generating the notification upon detecting the key performance indicator violation; and means for transmitting the notification to a central repository within a network.

In Example 19, any of Examples 16-18 can optionally include means for updating a service chain in response to detecting the key performance indicator violation.

In Example 20, any of Examples 16-19 can optionally include the control device being a virtual network function orchestrator.

In Example 21, any of Examples 16-20 can optionally include means for storing the performance indicators for each of the plurality of devices within the WAN in a central repository.

In Example 22, a method comprises: receiving, at a control device comprising a processor, performance indicators including latency and resource usage from the WAN interface and the at least one local interface; identifying, by the control device, one of a plurality of devices having a value for a performance indicator that violates a service level agreement for a corresponding key performance indicator; and providing a notification of a violation based on identifying the one of the plurality of devices that violates the service level agreement.

In Example 23, Example 22 can optionally include detecting a key performance indicator violation responsive to receiving the performance indicators.

In Example 24, Example 23 can optionally include: generating the notification upon detecting the key performance indicator violation; and transmitting the notification to a central repository within a network.

In Example 25, any of Examples 23 or 24 can further include updating a service chain in response to detecting the key performance indicator violation.

In Example 26, any of Examples 22-25 can further include storing the performance indicators for each of the plurality of devices within the WAN in a central repository.

The above detailed description includes references to the accompanying drawings, which form a part of the detailed description. The drawings show, by way of illustration, specific embodiments that may be practiced. These embodiments are also referred to herein as "examples." Such examples may include elements in addition to those shown or described. However, also contemplated are examples that include the elements shown or described. Moreover, also contemplate are examples using any combination or permutation of those elements shown or described (or one or more aspects thereof), either with respect to a particular example (or one or more aspects thereof), or with respect to other examples (or one or more aspects thereof) shown or described herein.

Publications, patents, and patent documents referred to in this document are incorporated by reference herein in their entirety, as though individually incorporated by reference. In the event of inconsistent usages between this document and those documents so incorporated by reference, the usage in the incorporated reference(s) are supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to suggest a numerical order for their objects.

The above description is intended to be illustrative, and not restrictive. For example, the above-described examples (or one or more aspects thereof) may be used in combination with others. Other embodiments may be used, such as by one of ordinary skill in the art upon reviewing the above description. The Abstract is to allow the reader to quickly ascertain the nature of the technical disclosure and is submitted with the understanding that it will not be used to interpret or limit the scope or meaning of the claims. Also, in the above Detailed Description, various features may be grouped together to streamline the disclosure. However, the claims may not set forth features disclosed herein because embodiments may include a subset of said features. Further, embodiments may include fewer features than those disclosed in a particular example. Thus, the following claims are hereby incorporated into the Detailed Description, with a claim standing on its own as a separate embodiment. The scope of the embodiments disclosed herein is to be determined with reference to the appended claims, along with the full scope of equivalents to which such claims are entitled.

The invention claimed is:

1. A control device comprising:
a wide area network (WAN) interface to communicate with a plurality of WAN links;
at least one local interface to communicate with virtual network functions (VNFs);
processing circuitry configured to:
receive performance indicators including latency and resource usage from the WAN interface and the at least one local interface,
identify, responsive to receiving performance indicators, one of a plurality of devices having a value for a performance indicator that violates a service level agreement for a corresponding key performance indicator, and provide a notification of a violation based on identifying the one of the plurality of devices that violates the service level agreement, wherein the corresponding key performance indicator is selected from a plurality of key performance indicators, each of the plurality of key performance indicators corresponding to an application.

2. The control device of claim 1, wherein the processing circuitry is further configured to detect a key performance indicator violation responsive to receiving the performance indicators.

3. The control device of claim 2, wherein the processing circuitry is further configured to:

generate the notification upon detecting the key performance indicator violation; and transmit the notification to a central repository within a network.

4. The control device of claim 2, wherein the processing circuitry is further configured to update a service chain in response to detecting the key performance indicator violation.

5. The control device of claim 1, wherein the application is a video streaming service or a voice over internet protocol telephone service.

6. The control device of claim 1, wherein the control device is a virtual network function orchestrator.

7. The control device of claim 1, wherein the processing circuitry is further configured to store the performance indicators for each of the plurality of devices within a network in a central repository.

8. The control device of claim 7, wherein the control device further includes a memory for storing the central repository.

9. A machine-readable medium including instructions that, when executed on a machine, cause the machine to perform operations including:

receiving, at a wide area network (WAN) interface, performance indicators including latency and resource usage from the WAN interface and at least one local interface;

identifying, response to receive performance indicators, one of a plurality of devices having a value for a performance indicator that violates a service level agreement for a corresponding key performance indicator; and provide a notification of violation based on identifying the one of the plurality of devices that violates the service level agreement, wherein the corresponding key performance indicator is selected from a plurality of key performance indicators, each of the plurality of key performance indicators corresponding to an application.

10. The machine-readable medium of claim 9, wherein the operations further include detecting a key performance indicator violation responsive to receiving the performance indicators.

11. The machine-readable medium of claim 10, wherein the operations further include:

generating the notification upon detecting the key performance indicator violation; and transmitting the notification to a central repository within a network.

12. The machine-readable medium of claim 10, wherein the operations further include updating a service chain in response to detecting the key performance indicator violation.

13. The machine-readable medium of claim 9, wherein the machine-readable medium is stored in non-transitory memory of a control device that acts as a virtual network function orchestrator.

14. The machine-readable medium of claim 9, wherein the operations further include storing the performance indicators for each of the plurality of devices within a network in a central repository.

15. A control device comprising:

means for receiving performance indicators including latency and resource usage from a wide area network (WAN) interface and at least one local interface;

means for identifying one of a plurality of devices having a value for a received performance indicator that violates a service level agreement for a corresponding key performance indicator; and means for providing a notification of violation based on identifying the one of the plurality of devices that violates the service level agreement, wherein the corresponding key performance indicator is selected from a plurality of key performance indicators, each of the plurality of key performance indicators corresponding to an application.

16. The control device of claim 15, further comprising means for detecting a key performance indicator violation responsive to receiving the performance indicators.

17. The control device of claim 16, further comprising:

means for generating the notification upon detecting the key performance indicator violation; and means for transmitting the notification to a central repository within a network.

18. The control device of claim 16, further comprising means for updating a service chain in response to detecting the key performance indicator violation.

19. The control device of claim 15, wherein the control device is a virtual network function orchestrator.

20. The control device of claim 15, further comprising means for storing the performance indicators for each of the plurality of devices within a WAN in a central repository.

21. A method comprising:

receiving, at a control device comprising a processor, performance indicators including latency and resource usage from a wide area network (WAN) interface and the at least one local interface;

identifying, by the control device responsive to receive performance indicators, one of a plurality of devices having a value for a performance indicator that exceeds a threshold for a corresponding key performance indicator; and providing, by the control device, notification of violation based on the identifying, wherein the corresponding key performance indicator is selected from a plurality of key performance indicators, each of the plurality of key performance indicators corresponding to an application.

22. The method of claim 21, further comprising detecting a key performance indicator violation responsive to receiving the performance indicators.

23. The method of claim 22, further comprising:

generating a notification upon detecting the key performance indicator violation; and transmitting the notification to a central repository within a network.

24. The method of any of claim 22 or 23, further comprising updating a service chain in response to detecting the key performance indicator violation.

* * * * *